US009992657B2

(12) United States Patent
Sharma et al.

(10) Patent No.: US 9,992,657 B2
(45) Date of Patent: Jun. 5, 2018

(54) RELAY OF CHARGING INFORMATION FOR PROXIMITY SERVICES

(71) Applicant: Alcatel-Lucent USA Inc., Murray Hill, NJ (US)

(72) Inventors: Ranjan Sharma, New Albany, OH (US); Yigang Cai, Naperville, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 259 days.

(21) Appl. No.: 14/495,312

(22) Filed: Sep. 24, 2014

(65) Prior Publication Data

US 2016/0088468 A1 Mar. 24, 2016

(51) Int. Cl.

| | |
|---|---|
| *H04W 88/04* | (2009.01) |
| *H04W 4/24* | (2018.01) |
| *H04W 76/02* | (2009.01) |
| *H04M 15/00* | (2006.01) |
| *H04L 12/14* | (2006.01) |
| *H04W 8/00* | (2009.01) |
| *H04W 84/12* | (2009.01) |

(52) U.S. Cl.
CPC ........... *H04W 4/24* (2013.01); *H04L 12/1403* (2013.01); *H04M 15/65* (2013.01); *H04M 15/93* (2013.01); *H04W 76/023* (2013.01); *H04W 8/005* (2013.01); *H04W 84/12* (2013.01); *H04W 88/04* (2013.01)

(58) Field of Classification Search
CPC ........ H04W 4/24; H04W 88/04; H04L 12/14; H04M 15/65

See application file for complete search history.

(56) References Cited

U.S. PATENT DOCUMENTS

| | | | | |
|---|---|---|---|---|
| 2013/0288668 | A1* | 10/2013 | Pragada | H04W 12/06 455/426.1 |
| 2014/0134974 | A1 | 5/2014 | Kuo | |
| 2015/0009949 | A1* | 1/2015 | Khoryaev | H04W 48/16 370/330 |

FOREIGN PATENT DOCUMENTS

WO 2014044326 A2 3/2014

OTHER PUBLICATIONS

3rd Generation Partnership Project, Study on LTE Device to Device Proximity Services, 3GPP TR 36.843, Version 12.0.1 (Mar. 2014).
3rd Generation Partnership Project, Proximity-based Services, 3GPP TS 23.303, Version 12.0.0 (Feb. 2014).

(Continued)

*Primary Examiner* — Awet Haile
*Assistant Examiner* — Kent Krueger
(74) *Attorney, Agent, or Firm* — Duft Bornsen & Fettig, LLP

(57) ABSTRACT

Systems and methods for providing charging information for a device-to-device (D2D) communication. One embodiment is User Equipment (UE) that collects charging information for a D2D communication with one or more other UEs, to determine that the UE is out-of-coverage of a mobile network, to select a relay entity capable of relaying the charging information from the UE to the mobile network, and to transmit the charging information to the relay entity. The relay entity may then relay the charging information to the mobile network to initiate charging for the D2D communication.

18 Claims, 6 Drawing Sheets

(56) References Cited

OTHER PUBLICATIONS

3rd Generation Partnership Project, Feasibility Study for Proximity Services (ProSe), 3GPP TR 22.803, Version 12.2.0 (Jun. 2013).
3rd Generation Partnership Project, Study on Charging Support of Proximity-based Services (ProSe), 3GPP TR 32.844, Version 1.0.1 (Sep. 2014).
3rd Generation Partnership Project, Proximity-based Services (ProSe) charging, 3GPP TS 32.277, Version 1.0.0 (Sep. 2014).
3GPP TSG SA WG5 (Telecom Management) Meeting #94, Oranjestad, Aruba Mar. 24-28, 2014, S5-140606.
3GPP TSG-SA WG1 Meeting #61, Prague, Czech Republic, Jan. 28-Feb. 1, 2013.

* cited by examiner

RELAY OF CHARGING INFORMATION FOR PROXIMITY SERVICES

FIELD OF THE INVENTION

The invention is related to the field of communication systems and, in particular, to charging for proximity services.

BACKGROUND

Proximity services or proximity-based services refer to services provided between devices (i.e., User Equipment (UE)) being in proximity to each other. Proximity services utilize the radio technologies of the UEs so that the UEs in close proximity can exchange communications directly with one another without going through the core network, which is also referred to as device-to-device (D2D) communications. A UE is considered in "proximity" of another UE if they are able to establish direct communications.

The Third Generation Partnership Program (3GPP) has defined Proximity Services (ProSe) for a Long Term Evolution (LTE) network. ProSe allows for D2D communications as an underlay to the cellular network. In D2D communications, UEs transmit data signals to each other over a direct link using the cellular resources instead of routing the data signals through the core network. Therefore, D2D communications involve directly transmitting traffic between UEs that are in the vicinity of one another instead of routing the traffic over a core network, such as the Evolved Packet Core (EPC). Because there is direct communication between UEs that are in close proximity, D2D communications offload traffic from the EPC network without additional infrastructure. D2D communications may also offer higher data rates, lower transfer delays, and better power efficiency within a UE.

Proximity services generally include direct discovery, direct communication, and UE-to-network relay. Direct discovery is a function where a UE identifies other UEs that are in proximity. Direct communication is a function where UEs in proximity are able to communicate using local radio resources. UE-to-network relay is a function where a UE can relay traffic from a remote UE to the network, or from the network to the remote UE. For example, if a UE (referred to as a remote UE) is outside of the coverage area of the base stations for a network, then the UE-to-network relay function allows the remote UE to transmit traffic to a relay UE that is in the coverage area of a base station through a direct communication with the relay UE. The relay UE in turn forwards the traffic from the remote UE to the network by communicating with a base station of the network.

SUMMARY

Embodiments described herein provide an offline charging mechanism for D2D communications. A UE involved in a D2D communication collects charging information for the D2D communication. When the UE is out-of-coverage of the mobile network and cannot directly forward the charging information to the mobile network, the UE is able to forward the charging information to a relay entity that does have a connection with the network. The relay entity may then relay the charging information for the D2D communication to the mobile network. Thus, even though the UE is out-of-coverage of the mobile network, it is able to provide the charging information to an offline charging system for the mobile network through the relay entity. The offline charging mechanism may then initiate charging for the D2D communication.

One embodiment comprises a UE having a radio interface configured to exchange over-the-air signals, and a charging controller. The charging controller is configured to collect charging information for a D2D communication with one or more other UEs. The charging controller is configured to determine that the UE is out-of-coverage of a mobile network, and to select a relay entity capable of relaying the charging information from the UE to the mobile network. The radio interface is configured to transmit the charging information to the relay entity.

In another embodiment, the relay entity comprises a relay UE, and the radio interface is configured to transmit the charging information to the relay UE in a signaling message over a control channel.

In another embodiment, the charging controller is configured to receive a control message from the mobile network when the UE is in-coverage of the mobile network indicating a default relay identity for the UE, and to select the relay entity based on the default relay identity when the UE goes out-of-coverage of the mobile network.

In another embodiment, when multiple relay entities are available to the UE, the charging controller is configured to select one of the relay entities that has a connection with a Wireless Local Area Network (WLAN).

In another embodiment, when multiple relay entities are available to the UE, the charging controller is configured to select one of the relay entities based on signal strength between the UE and the relay entities.

In another embodiment, when multiple relay entities are available to the UE, the charging controller is configured to select one of the relay entities that is in-coverage of the mobile network.

In another embodiment, when multiple relay entities are available to the UE, the charging controller is configured to select one of the relay entities based on a number of hops from each of the relay entities to the mobile network.

In another embodiment, the charging information is for multiple D2D communications involving the UE.

Another embodiment comprises a method for providing charging information for a D2D communication. The method includes collecting charging information in a UE for a D2D communication with one or more other UEs, determining that the UE is out-of-coverage of a mobile network, selecting a relay entity capable of relaying the charging information from the UE to the mobile network, and transmitting the charging information from the UE to the relay entity.

Another embodiment is a relay entity having a connection with a mobile network. The relay entity includes a radio interface configured to receive charging information for a D2D communication involving a UE that is out-of-coverage of the mobile network. The relay entity also includes a charging relay controller configured to identify a routing address to relay the charging information, and to relay the charging information to the routing address.

In another embodiment, the charging relay controller is configured to relay the charging information to the mobile network through a WLAN.

In another embodiment, the radio interface is configured to receive the charging information from the UE in a signaling message over a control channel.

In another embodiment, the charging relay controller is configured to relay the charging information to the mobile network through a RAN.

In another embodiment, the relay entity comprises relay UE that is in-coverage of the RAN of the mobile network.

In another embodiment, the charging relay controller is configured to store a pre-provisioned network address for a Charging Trigger Function (CTF) for which to send the charging information.

Another embodiment comprises a method of relaying charging information in a relay entity having a connection with a mobile network. The method includes receiving charging information for a D2D communication involving a UE that is out-of-coverage of the mobile network, identifying a routing address to relay the charging information, and relaying the charging information to the routing address.

The above summary provides a basic understanding of some aspects of the specification. This summary is not an extensive overview of the specification. It is intended to neither identify key or critical elements of the specification nor delineate any scope of the particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
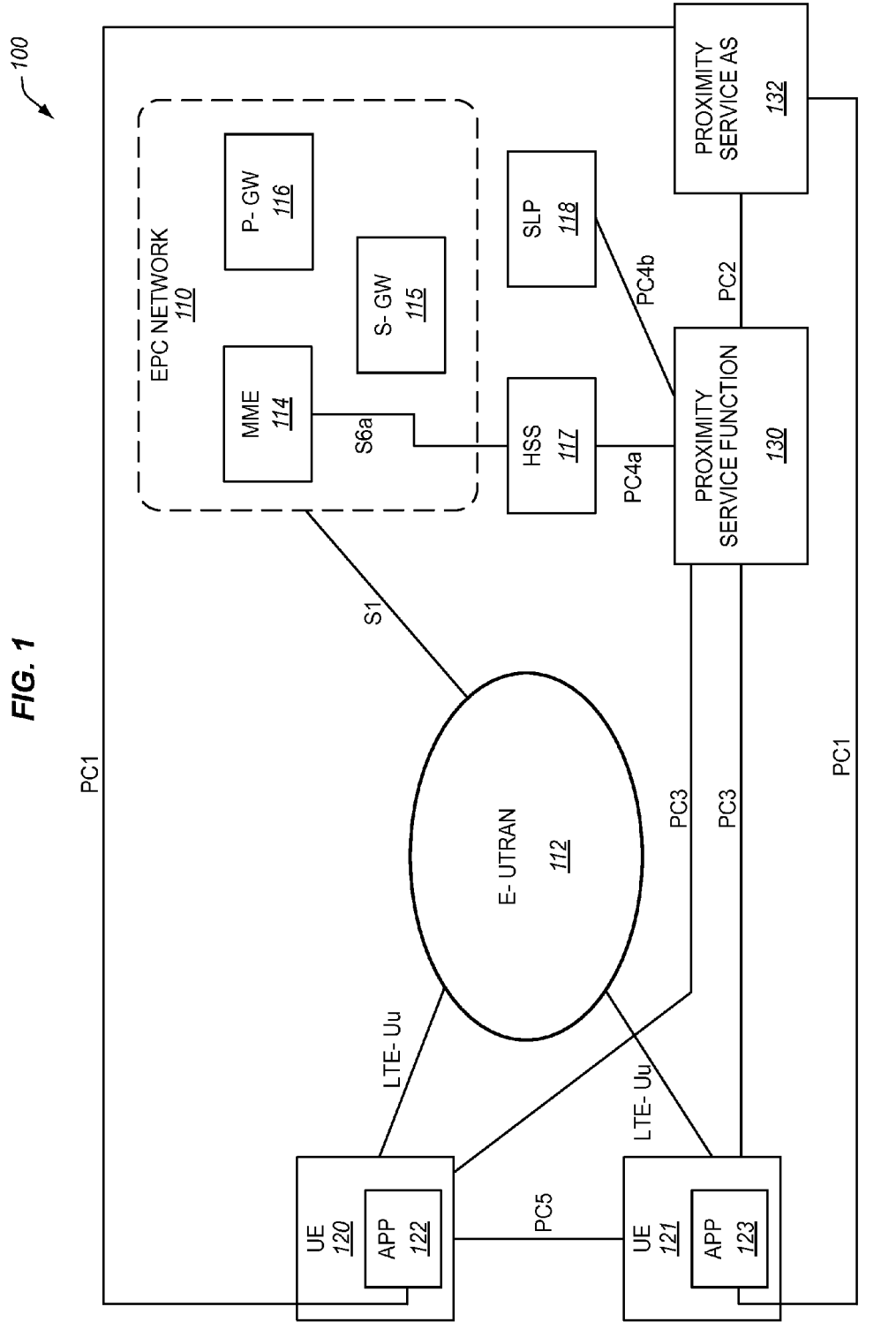
FIG. 1 illustrates an architecture of a mobile network for ProSe features in an LTE network

FIG. 1 illustrates an architecture of a mobile network 100 (e.g., Public Land Mobile Network (PLMN)) for ProSe features in an LTE network. Architecture 100 is described in 3GPP TS 23.303 (v12.0.0), which is incorporated by reference as if fully included herein. Architecture 100 includes an Evolved Packet Core (EPC) network 110 that communicates with UEs 120-121 over a Radio Access Network (RAN), which is illustrated as an Evolved-UMTS Terrestrial Radio Access Network (E-UTRAN) 112. Although not shown in FIG. 1, E-UTRAN 112 includes a plurality of base stations (e.g., eNodeB) that provide wireless connections between UEs 120-121 (and other UEs) and EPC network 110. EPC network 110 includes a Mobility Management Entity 114, an S-GW 115, and a P-GW 116, but may include other elements not shown. The operation of these elements in EPC network 110 is outside of the scope of the embodiments described herein. Architecture 100 also includes a Home Subscriber Server (HSS) 117 and a Secure User Plane Location Platform (SLP) 118, which are also beyond the scope of the embodiments.

The architecture 100 in FIG. 1 illustrates a non-roaming scenario. However, there may be other architectures applicable to the embodiments described herein, such as an inter-PLMN architecture (see FIGS. 4.2-2 of 3GPP TS 23.303), a roaming architecture (see FIGS. 4.2-3 of 3GPP TS 23.303), an architecture when a UE is covered by a WLAN instead of an E-UTRAN, etc.

Architecture 100 further includes a Proximity Service (ProSe) function 130 and a ProSe Application Server (AS) 132. ProSe function 130 comprises any server, device, apparatus, or equipment (including hardware) that is used for network-related actions required for proximity services. ProSe function 130 may play different roles for each of the features of a proximity service. ProSe AS 132 comprises any server, device, apparatus, or equipment (including hardware) that supports storage of EPC ProSe User IDs and ProSe Function IDs, and mapping of Application Layer User IDs and EPC ProSe User IDs.

UEs 120-121 comprise any devices used directly by an end user for communication, such as a mobile terminal, a laptop computer equipped with a mobile broadband adapter, etc. UEs 120-121 may be considered as ProSe-enabled, meaning that they support ProSe requirements and associated procedures. A ProSe-enabled UE as described herein refers to both a non-Public Safety UE and a Public Safety UE. Each UE 120-121 includes an application 122 and 123, respectively, that is used to access/provide proximity services (e.g., ProSe), such as D2D direct communication and UE-to-network relay. The applications 122-123 may comprise a local voice service, multimedia content sharing, gaming, group multicast, content-aware applications, public safety, etc.

Although 3GPP ProSe is discussed above for architecture 100, this is just one example. The concepts discussed herein are applicable to any proximity service that enables direct communication between end user devices. Proximity services as discussed herein include the following functions: discovery, direct communication (D2D), and UE-to-network relay. Discovery is a process that identifies a UE in proximity of other UEs. One type of discovery is direct discovery, which is a process employed by a UE to discover other UEs in its vicinity by using only the capabilities of the two UEs. For example, one UE may use local radio resources to discover the presence of other UEs in its vicinity. Another type of discovery is referred to as EPC-level discovery, which is a process by which EPC network 110 determines the proximity of two UEs and informs them of their proximity. For example, a server in EPC network 110 may monitor the location of UEs, and inform the UEs of their proximity.

Direct communication is a communication between two or more UEs in proximity by means of user data plane transmission using radio technology (e.g., E-UTRA) via a channel not traversing any network node (other than possibly a base station of a RAN). Direct communication allows the UEs to use local radio resources to communicate directly with each other without routing traffic through a core network, such as EPC network 110. For example, UEs may directly communicate through the radio resources available to both UEs from a RAN, such as from a base station. UEs may also directly communicate through the radio resources of the UEs themselves, such as over the PC5 reference point. Either way, the traffic exchanged between the UEs is not routed through the core network, but is routed directly between the UEs over a wireless interface.

Figure 2:
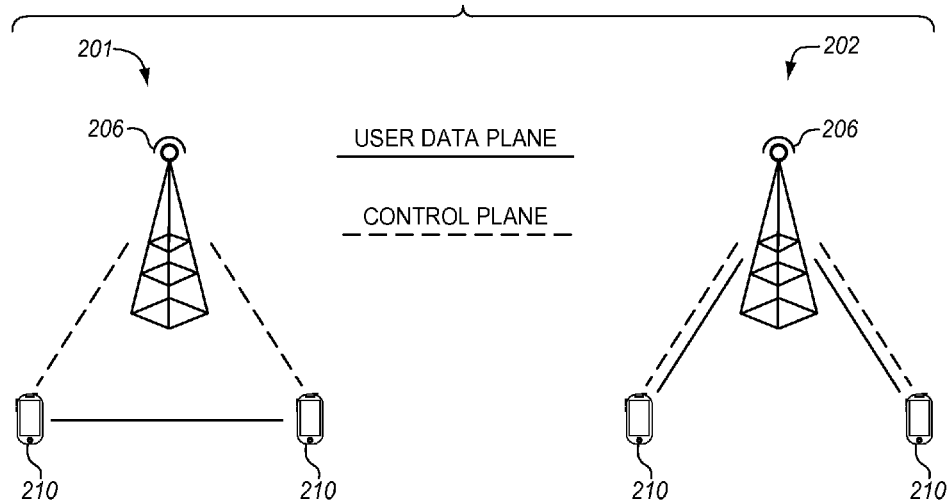
FIG. 2 illustrates direct communication scenarios between two UEs.

FIG. 2 illustrates direct communication scenarios between two UEs. In scenario 201, a base station 206 is in communication with UEs 210-211. Base station 206 communicates with UEs 210-211 over the control plane (also referred to as control path or control channel) to exchange signaling messages and other types of control messages with UEs 210-211. UEs 210-211 are able to establish a direct communication over a user data plane (also referred to as a data path or data channel) using local radio resources to communicate directly with each other without routing traffic through a core network. In scenario 202, base station 206 again communicates with UEs 210-211 over the control plane to exchange signaling messages and other types of control messages with UEs 210-211. UEs 210-211 are able to establish a direct communication over the user data plane through base station 206 without routing traffic through a core network. In each of the above scenarios, UEs 210-211 establish a direct communication between each other, which is also referred to herein as a D2D communication.

UE-to-network relay is a function where one UE provides functionality to support connectivity to "unicast" services for one or more remote UEs. A remote UE refers to a UE that is not served by a RAN (e.g., E-UTRAN), and communicates with a Packet Data Network (PDN) through a UE-to-network relay. For instance, if a remote UE is out-of-coverage of a RAN, then the remote UE may still access the PDN through another UE (relay UE) that is in-coverage of the RAN. A relay UE is a device that is enabled for UE-to-network relay. UE-to-network relay allows for one-to-one or one-to-many communications from the network to a remote UE via a relay UE which is in-coverage, or from a remote UE to the network via a relay UE that is in-coverage. Therefore, the term "UE-to-network relay" refers to communication from a remote UE to the network, and from the network to the remote UE. The communication between a remote UE and a relay UE, or between two relay UEs, is referred to as a direct communication or D2D communication. The remote UE communicates with the UE-to-Network relay over the PC5 reference point. The PC5 reference point is the reference point between UE to UE used for control and user plane for discovery, direct communication, and UE-to-Network Relay.

Figure 3:
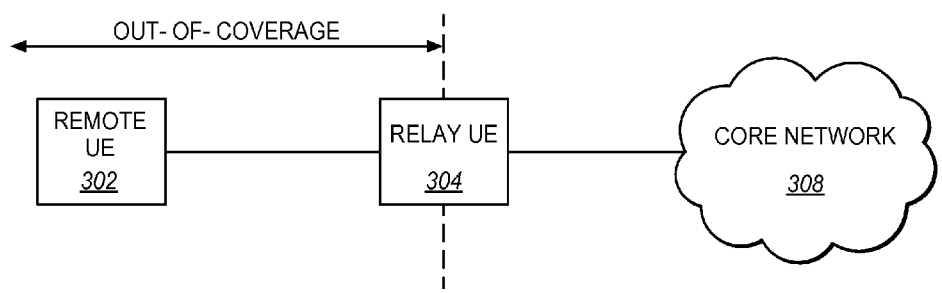
FIG. 3 illustrates a relay scenario in an exemplary embodiment.

The embodiments described herein apply to a relay function for proximity services. FIG. 3 illustrates a relay scenario in an exemplary embodiment. In the relay scenario, a remote UE 302 is out-of-coverage of a RAN but has communication with a relay entity 304. In turn, relay entity 304 has a connection with a core network 308. Relay entity 304 comprises any device that is able to act as a relay for a UE that is out-of-coverage of a RAN. The term "out-of-coverage" refers to a UE that is outside of the coverage area of any base station of a RAN for a mobile network. A RAN refers to the air interface and base station technology in a cellular network, one example of which is an E-UTRAN. The term "in-coverage" refers to a UE that is in the coverage area of a base station of a RAN.

Relay entity 304 may comprise a relay UE that is enabled for UE-to-network relay. For instance, a relay UE may be in-coverage of a base station (e.g., eNodeB) of a mobile network, and is enabled to relay unicast traffic (UL and DL) between remote UE 302 and core network 308. Relay entity 304 may alternatively comprise a relay device of a Wireless Local Area Network (WLAN), such as a WLAN router. A WLAN links two or more devices using a wireless distribution method (e.g., Wi-Fi or Wi-MAX), and typically provides a connection through an access point to the packet data network, such as the Internet. A relay device of a WLAN is able to communicate with remote UE 302, and relay traffic from remote UE 302 to core network 308.

Figure 4:
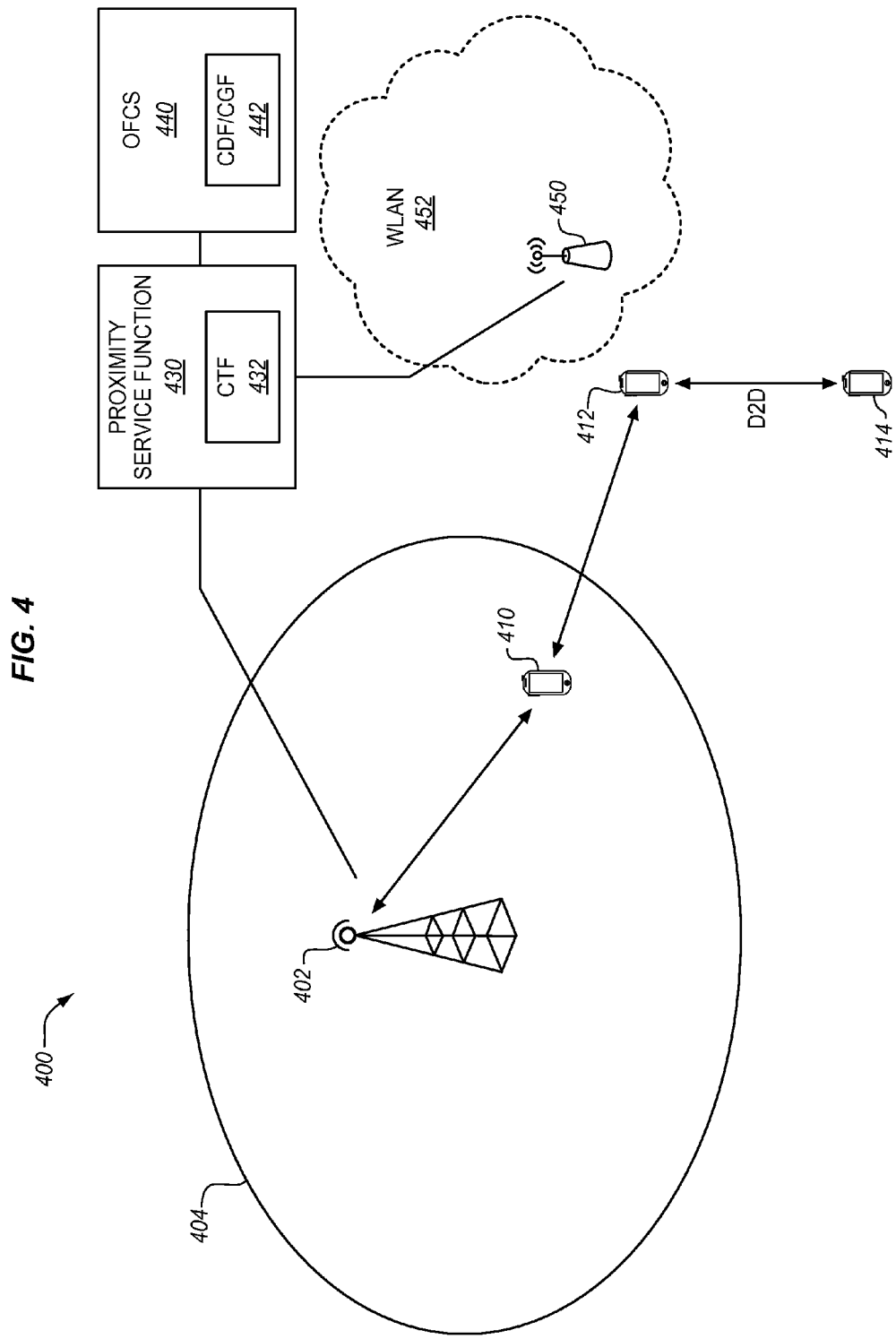
FIG. 4 is a schematic diagram of a mobile network illustrating a relay function used for offline charging in an exemplary embodiment.

FIG. 4 is a schematic diagram of a mobile network 400 illustrating a relay function used for offline charging in an exemplary embodiment. Mobile network 400 includes a base station 402 that has a coverage area 404 (or service area) representing a cell. In this embodiment, UE 410 may represent a relay UE for a UE-to-network relay function. UE 410 is within the coverage area 404 of base station 402, so UE 410 is considered in-coverage of base station 402. UE 410 is enabled for relaying of charging information from a remote UE to mobile network 400.

UE 412 and UE 414 have established a D2D communication. In other words, UE 412 and UE 414 performed a discovery function, and have initiated a direct communication with one another. UE 412 is not within the coverage area 404 of base station 402, but does have communication capability with UE 410 that is within the coverage area 404 of base station 402. UE 412 may have service through the same service provider as UE 410, or they may have different service providers.

Mobile network 400 also includes a proximity service function 430 and an offline charging system (OFCS) 440. Proximity service function 430 comprises a server, device, apparatus, or equipment (including hardware) that is used for network-related actions required for proximity services. One example of proximity service function 430 is a ProSe function defined by the 3GPP. Proximity service function 430 includes a Charging Trigger Function (CTF) 432. A CTF is a component that detects chargeable events for services, assembles information for the chargeable events into matching charging events, and sends the charging events to an OFCS (e.g., a Charging Data Function (CDF)).

OFCS 440 comprises a server, device, apparatus, or equipment (including hardware) that provides offline charging for services provided in mobile network 400. OFCS 440 may include a Charging Data Function and Charging Gateway Function (CDF/CGF) 442. A CDF comprises an element or module within an OFCS that receives charging events from CTFs within network elements, formats the charging events into CDRs, and sends the CDRs to a CGF. A CGF comprises an element or module within an OFCS that correlates CDRs for a session, and forwards a CDR file with the correlated CDRs to a billing domain.

There may be intervening network elements between base station 402 and proximity service function 430 that are not shown for the sake of brevity, such as a Serving Gateway (SGW) or Packet Data Network Gateway (PGW) of an LTE network.

FIG. 4 also shows a WLAN device 450 of a WLAN 452 as part of mobile network 400. WLAN device 450 comprises a device, apparatus, or equipment (including hardware) that communicates with a UE through wireless signals. One example of WLAN device 450 is a WiFi router. In this embodiment, WLAN device 450 is able to communicate with proximity service function 430 through WLAN 452, and is enabled to act as a relay for charging information from a UE to proximity service function 430.

For this embodiment, UE 412 and UE 414 engage in a D2D communication. A UE that is part of a D2D communication, such as UE 412, is enhanced to provide charging information for the D2D communication to mobile network 400 through a relay function. Also, a relay entity, such as UE 410 or WLAN device 450, is enhanced to route charging information for a D2D communication to mobile network 400.

Figure 5:
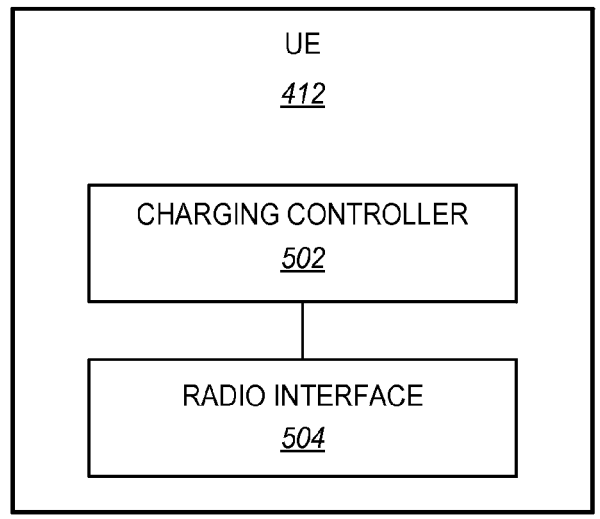
FIG. 5 illustrates a UE that provides charging information in an exemplary embodiment.

FIG. 5 illustrates UE 412 that provides charging information in an exemplary embodiment. UE 412 is enabled for proximity services, and is enhanced to provide charging information to mobile network 400 even when UE 412 is out-of-coverage of mobile network 400 (i.e., out-of-coverage of base station 402). UE 412 includes a charging controller 502 (including a processor) and a radio interface 504. Charging controller 502 is configured to send charging information for a D2D communication to a mobile network through a relay entity. Radio interface 504 represents the local radio resources of UE 412, such as a transceiver and an antenna, used for wireless communications to exchange over-the-air signals. Any UE involved in a D2D communication may have a similar configuration as UE 412.

Figure 6:
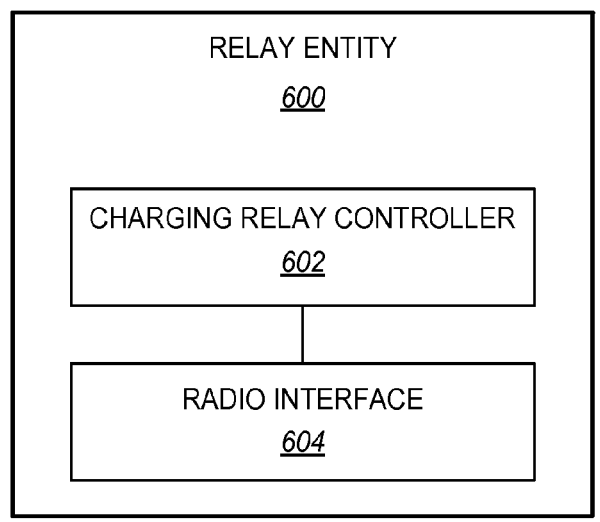
FIG. 6 illustrates a relay entity in an exemplary embodiment.

FIG. 6 illustrates a relay entity 600 in an exemplary embodiment. Relay entity 600 may represent UE 410 in FIG. 4, WLAN device 450, or any other device enabled for relay functions. Relay entity 600 includes a charging relay controller 602 (including a processor) and a radio interface 604. Charging relay controller 602 is configured to route charging information from an out-of-coverage UE to a mobile network through a relay function. Radio interface 604 represents the local radio resources of relay entity 600, such as a transceiver and an antenna, used for wireless communications to exchange over-the-air signals.

Figure 7:
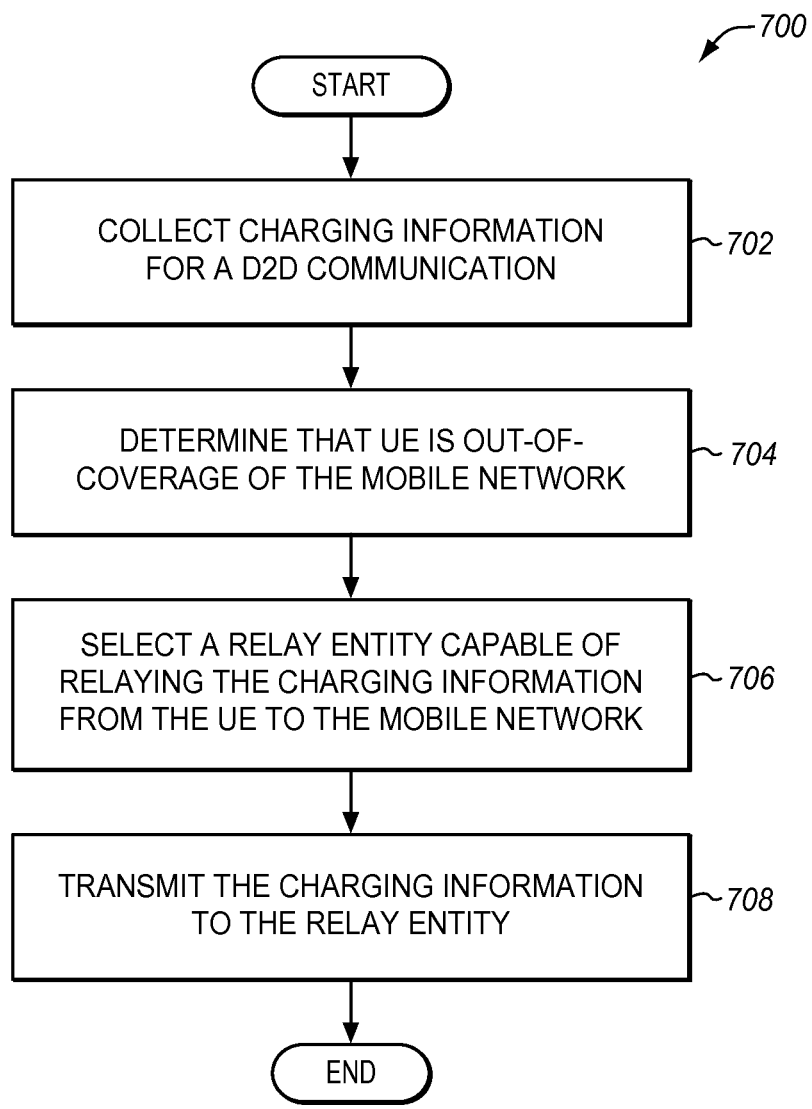
FIG. 7 is a flow chart illustrating a method for providing charging information for a D2D communication in an exemplary embodiment.

FIG. 7 is a flow chart illustrating a method 700 for providing charging information for a D2D communication in an exemplary embodiment. The steps of method 700 will be described with reference to UE 412 in FIG. 5, but those skilled in the art will appreciate that method 700 may be performed in other systems. Also, the steps of the flow charts described herein are not all inclusive and may include other steps not shown, and the steps may be performed in an alternative order.

Charging controller 502 in UE 412 collects charging information for the D2D communication with UE 414 and/or other UEs not shown (step 702). The charging information includes any data used to perform offline charging for the D2D communication. For example, the charging information may include an application ID, a session ID, a charging ID, timestamps (e.g., start and end of D2D communication), etc. The charging information may be for a single D2D communication, or multiple D2D communications involving UE 412. After collecting the charging information, charging controller 502 may temporarily store the charging information, such as in a local memory.

Charging controller 502 determines that UE 412 (i.e., the radio interface 504 of UE 412) is out-of-coverage of mobile network 400 (step 704). As shown in FIG. 4, UE 412 is out-of-coverage of base station 402 (and other base stations of mobile network 400), so charging controller 502 is able to determine that UE 412 is out-of-coverage of mobile network 400. Because UE 412 is out-of-coverage of mobile network 400, it cannot send the charging information directly to mobile network 400. Therefore, charging controller 502 selects a relay entity capable of relaying the charging information from UE 412 to mobile network 400 (step 706). There may be multiple relay entities available to charging controller 502 from which to select, and charging controller 502 may select one of the relay entities in a variety of ways. In one embodiment, charging controller 502 may select one of the relay entities that has a connection with WLAN 452, such as WLAN device 450. For example, if one of the relay entities has a connection with a WLAN and other relay entities are in-coverage of the RAN (i.e., base station 402), then charging controller 502 may select the relay entity having a connection with the WLAN instead of the relay entities in-coverage of the RAN.

In another embodiment, charging controller 502 may select one of the relay entities based on signal strength between UE 412 and the relay entities. For example, if there are multiple relay entities in-coverage of the RAN, then charging controller 502 may select the relay entity which has the strongest signal with UE 412.

In another embodiment, charging controller 502 may select one of the relay entities based on a number of hops from each of the relay entities to mobile network 400. A hop or degree of separation may indicate the number of D2D links that are established between a relay UE and another relay UE that is in-coverage of a base station. For example, UE 410 is in-coverage of base station 402, so UE 412 would have zero hops to relay UE 410. If UE 412 did not have direct communication with UE 410 (that is in-coverage) but had D2D communication with UE 410 through another relay UE (not shown in FIG. 4), then UE 412 would have 1 hop (e.g., one D2D link) to UE 410. Charging controller 502 may select the relay entity having the least number of hops to mobile network 400.

In another embodiment, charging controller 502 may receive a default relay identity from mobile network 400. Although UE 412 is out-of-coverage as shown in FIG. 4, UE 412 is mobile and may have been in-coverage of mobile network 400 at an earlier time. When UE 412 was in-coverage, charging controller 502 may receive a control message from mobile network 400 indicating a default relay identity for UE 412. For example, the default relay identity may be an identifier or address for UE 410, WLAN device 450, or another relay entity. Charging controller 502 may select the relay entity based on the default relay identity when UE 412 goes out-of-coverage of mobile network 400, as shown in FIG. 4.

A relay entity, such as a relay UE, may be a non-participant in the D2D communication indicated in the charging information. For example, in FIG. 4, UE 410 is not a participant in the D2D communication for which the charging information pertains. Therefore, UE 410 would act as a non-participating relay UE. There may be instances where the relay UE may be a participant in the D2D communication, and also act as a relay UE for one or more other participants in the D2D communication that are out-of-coverage. For example, if UE 414 were in-coverage of mobile network 400, then UE 414 could act as a participating relay UE for UE 412.

After selecting the relay entity, radio interface 504 transmits the charging information to the relay entity (step 708 of FIG. 7). Radio interface 504 may transmit the charging information in different ways depending on which relay entity is selected. If the relay entity is a relay UE (e.g., relay UE 410), then radio interface 504 may transmit the charging information in a signaling message over the control channel. A signaling message is a type of message used for mobility management, authentication, security, session management, etc. The control channel may use Non-Access Stratum (NAS) protocol or another protocol.

Radio interface 504 may alternatively set up a data channel (i.e., a D2D communication) with the relay UE through signaling messages, and transmit the charging information over the data channel. If the relay entity is a WLAN device (e.g., WLAN device 450), then radio interface 504 may establish a data channel (i.e., a WiFi communication) with the WLAN device, and transmit the charging information over the data channel.

Figure 8:
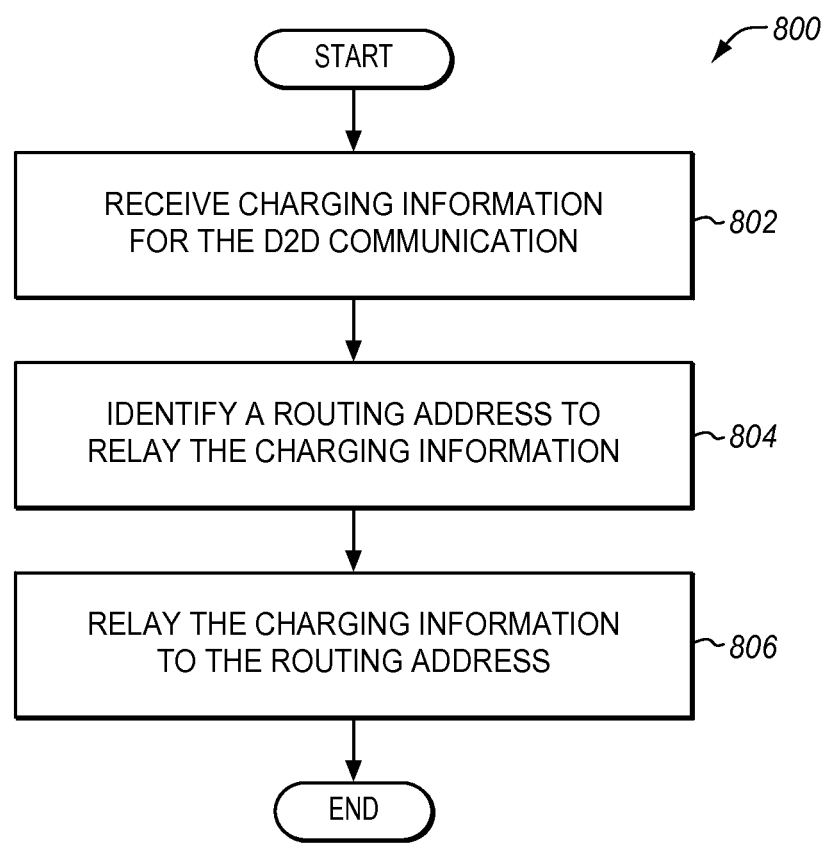
FIG. 8 is a flow chart illustrating a method for relaying the charging information to a mobile network in an exemplary embodiment.

After UE 412 transmits the charging information to the relay entity, the relay entity operates to relay the charging information to mobile network 400. FIG. 8 is a flow chart illustrating a method 800 for relaying the charging information to mobile network 400 in an exemplary embodiment. The steps of method 800 will be described with reference to relay entity 600 in FIG. 6, but those skilled in the art will appreciate that method 800 may be performed in other systems.

Radio interface 604 of relaying entity 600 receives the charging information for the D2D communication (step 802). In response to receiving the charging information, charging relay controller 602 identifies a routing address to relay the charging information (step 804). Charging relay controller 602 may be pre-provisioned with a routing address for the charging information. For example, charging relay controller 602 may store a network address for a Charging Trigger Function (CTF) in mobile network 400 that is configured to generate a charging event for the D2D communication. The CTF may be in proximity service function 430 (see CTF 432 in FIG. 4), in an application server (not shown in FIG. 4), or some other network element. The CTF will collect the charging information, assemble the charging information into a matching charging event, and send the charging event to OFCS 440. Charging relay controller 602 may also query a device in mobile network 400 (or another mobile network), such as a Home Subscriber Server (HSS), for a routing address to relay the charging information.

Charging relay controller 602 then relays the charging information to the routing address (step 806). Relay entity 600 may therefore relay the charging information received from UE 412 to mobile network 400. For example, if relay entity 600 is UE 410, then UE 410 may forward the charging information to proximity service function 430 through base station 402. If relay entity 600 is WLAN device 450, then WLAN device 450 may forward the charging information to proximity service function 430 through WLAN 452. Relay entity 600 may also relay the charging information to another relay entity.

The content of the charging information may vary as desired. In a 3GPP ProSe example, the charging information discussed above may include the following data:
ProSe Application ID
ProSe Application Code
ProSe Filter ID
ProSe Event/Session ID
ProSe Charging ID (optional. It could be pre-configured when UE has access to ProSe Function via any connection protocols)
Discovery Models (Model A/B or Discoverer/Discoveree)
ProSe Discovery Role Types
Direct Communication Types (One-to-One or One-to-Many)
Subscriber Identifier
Subscriber ProSe Mode (Transmitter or Receiver)
Number of Recipients
Subscriber PLMN ID
ProSe Function ID
Subscriber Location Information
Served Network Type (=non-E-UTRAN)
ProSe timestamps
Other charging fields defined in 3GPP TS 32.299.

After the charging information is routed to CTF 432, for example, CTF 432 triggers a charging event toward OFCS 440 (see FIG. 4). For example, CTF 432 may generate a Diameter Rf Accounting Request (ACR) based on the charging information received for the D2D communication, and transmit the Diameter ACR to OFCS 440. CDF/CGF 442 may process the Diameter ACR to generate a CDR.

UE 414 may operate in a similar fashion to provide charging information for the D2D communication to mobile network 400. In the case of UE 414, it is also out-of-coverage of mobile network 400, so it may select a relay entity to relay the charging information to mobile network 400. UE 412 may operate as a relay entity in this example to relay the charging information to UE 410. UE 410 in turn may operate as a relay entity to relay the charging information to mobile network 400 (through base station 402).

The above embodiments advantageously allow a UE that is/was involved in a D2D communication(s) to send charging information to a mobile network even though the UE is out-of-coverage of the mobile network. Therefore, the UE does not have to store the charging information for an extended period of time until it is in-coverage of the mobile network, and the mobile network does not need to wait to initiate charging. The charging information could be lost if the UE is forced to store the charging information for an extended period of time, which results in lost revenue for the operator of the mobile network.

Any of the various elements or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the disclosure is not limited to those specific embodiments. The scope of the disclosure is defined by the following claims and any equivalents thereof.

We claim:

1. An apparatus comprising:
 remote User Equipment (UE) comprising:
  a radio interface configured to exchange over-the-air signals; and
  a charging controller configured to collect charging information for a device-to-device (D2D) communication with at least one other UE, and to temporarily store the charging information in a local memory;
  the charging controller is configured to determine that the remote UE is out-of-coverage of a mobile network and cannot send the charging information directly to the mobile network, and to select a relay UE capable of relaying the charging information from the remote UE to the mobile network so that the remote UE does not have to store the charging information in the local memory until the remote UE is in-coverage of the mobile network;
  the radio interface is configured to transmit the charging information to the relay UE on a control plane of the PC5 reference point.

2. The apparatus of claim 1 wherein:
 the charging controller is configured to receive a control message from the mobile network when the remote UE is in-coverage of the mobile network indicating a default relay identity for the remote UE, and to select the relay UE based on the default relay identity when the remote UE goes out-of-coverage of the mobile network.

3. The apparatus of claim 1 wherein:
 when multiple relay UEs are available to the remote UE, the charging controller is configured to select one of the relay UEs that has a connection with a Wireless Local Area Network (WLAN) instead of the relay UEs in-coverage of a Radio Access Network (RAN) of the mobile network.

4. The apparatus of claim 1 wherein:
 when multiple relay UEs are available to the remote UE, the charging controller is configured to select one of the relay UEs based on signal strength between the remote UE and the relay UEs.

5. The apparatus of claim 1 wherein:
 when multiple relay UEs are available to the remote UE, the charging controller is configured to select one of the relay UEs that is in-coverage of the mobile network.

6. The apparatus of claim 1 wherein:
 when multiple relay UEs are available to the remote UE, the charging controller is configured to select one of the relay UEs having a least number of hops to the mobile network.

7. The apparatus of claim 1 wherein:
 the charging information is for multiple D2D communications involving the remote UE.

8. A method comprising:
 collecting charging information in a remote User Equipment (UE) for a device-to-device (D2D) communication with at least one other UE;
 temporarily storing the charging information in a local memory of the remote UE;
 determining that the remote UE is out-of-coverage of a mobile network and cannot send the charging information directly to the mobile network;
 selecting a relay UE capable of relaying the charging information from the remote UE to the mobile network so that the remote UE does not have to store the charging information in the local memory until the remote UE is in-coverage of the mobile network; and
 transmitting the charging information from the remote UE to the relay UE on a control plane of the PC5 reference point.

9. The method of claim 8 wherein selecting a relay UE comprises:
 receiving a control message from the mobile network when the remote UE is in-coverage of the mobile network indicating a default relay identity for the remote UE; and
 selecting the relay UE based on the default relay identity when the remote UE goes out-of-coverage of the mobile network.

10. The method of claim 8 wherein selecting a relay UE comprises:
 when multiple relay UEs are available to the remote UE, selecting one of the relay UEs that has a connection with a Wireless Local Area Network (WLAN) instead of the relay UEs in-coverage of a Radio Access Network (RAN) of the mobile network.

11. The method of claim 8 wherein selecting a relay UE comprises:
 when multiple relay UEs are available to the remote UE, selecting one of the relay UEs based on signal strength between the remote UE and the relay UEs.

12. The method of claim 8 wherein selecting a relay UE comprises:
 when multiple relay UEs are available to the remote UE, selecting one of the relay UEs that is in-coverage of the mobile network.

13. The method of claim 8 wherein selecting a relay UE comprises:
 when multiple relay UEs are available to the remote UE, selecting one of the relay UEs having a least number of hops to the mobile network.

14. The method of claim 8 wherein:
 the charging information is for multiple D2D communications involving the remote UE.

15. An apparatus comprising:
 relay User Equipment (UE) having a connection with a mobile network, the relay UE comprising:
  a radio interface configured to receive charging information from a remote UE on a control plane of the PC5 reference point when the remote UE is out-of-coverage of the mobile network, wherein the charging information is for a device-to-device (D2D) communication involving the remote UE and at least one other UE, wherein the relay UE is a non-participant in the D2D communication for which the charging information pertains; and
  a charging relay controller configured to identify a pre-provisioned routing address for a Charging Trigger Function (CTF) in the mobile network that is configured to generate a charging event for the D2D communication, and to relay the charging information to the CTF in the mobile network based on the routing address.

16. The apparatus of claim 15 wherein:
 the CTF is implemented in a Proximity Service (ProSe) function of the mobile network.

17. A method comprising:
- receiving, in relay User Equipment (UE) having a connection with a mobile network, charging information from a remote UE on a control plane of the PC5 reference point when the remote UE is out-of-coverage of the mobile network, wherein the charging information is for a device-to-device (D2D) communication involving the remote UE and at least one other UE, wherein the relay UE is a non-participant in the D2D communication for which the charging information pertains;
- identifying a pre-provisioned routing address for a Charging Trigger Function (CTF) in the mobile network that is configured to generate a charging event for the D2D communication; and
- relaying the charging information from the relay UE to the CTF in the mobile network based on the routing address.

18. The method of claim 17 wherein relaying the charging information comprises:
- relaying the charging information to the CTF in a Proximity Service (ProSe) function of the mobile network.

\* \* \* \* \*